United States Patent Office 3,806,538
Patented Apr. 23, 1974

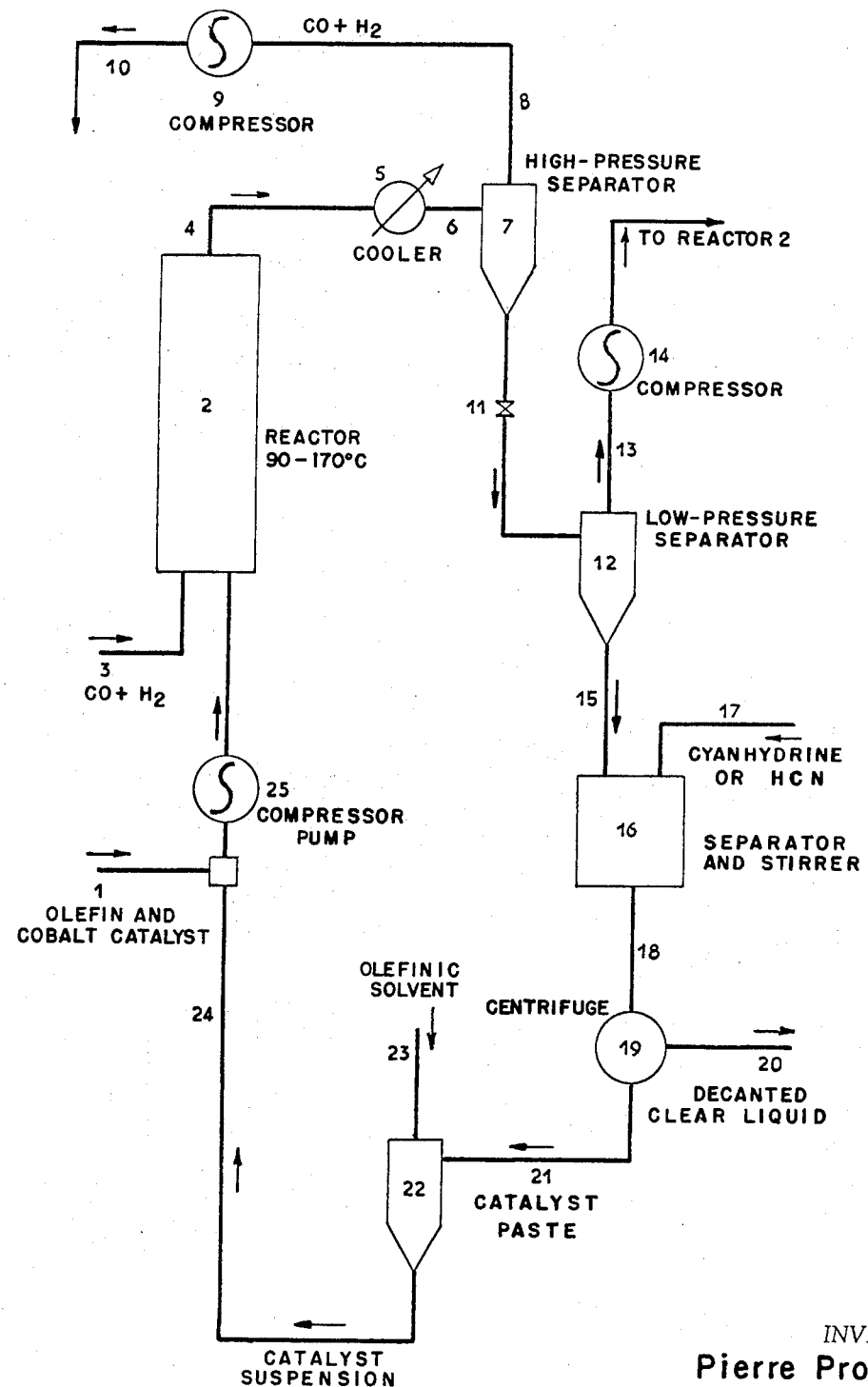

3,806,538
IMPROVED PROCESS FOR HYDROFORMING OF OLEFINS
Pierre Prognon, Portet-sur-Garonne, France, and Giancarlo Albanesi and Italo Pasquon, Milan, Italy, assignors to Azote et Produits Chimiques S.A., Toulouse, France
Filed Feb. 28, 1969, Ser. No. 803,309
Claims priority, application France, Mar. 4, 1968, 142,251; Feb. 3, 1969, 6902242
Int. Cl. C07c 47/02, 47/32, 69/66
U.S. Cl. 260—483  11 Claims

ABSTRACT OF THE DISCLOSURE

A process for the total separation and direct recycling of the catalyst from the hydroformylation of olefins by CO and $H_2$, said catalyst consisting of octa- or hydrocarbonyls of cobalt, optionally containing phosphorus containing promoters such as phosphites and phosphines, in which the catalyst is separated from the reaction products by insolubilization by means of hydrocyanic acid or cyanhydrins of the general formula

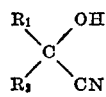

where $R_1$ and $R_2$ represent an atom of hydrogen or a hydrocarbon group and can be the same or different, saturated or unsaturated, linear or cyclic, and optionally containing aldehyde or ketonic groups, the quantity of cyanhydrin corresponding to a molar ratio of HCN/CO between 2 and 20, the complex cobalt cyanocarbonyl, possibly with the combined phosphorous compound, being then recycled in the hydroformylation process.

BACKGROUND OF THE INVENTION

The field of the invention is processes for preparing synthetic alcohols.

The state of the prior art may be ascertained by reference to the Kirk-Othmer, "Encyclopedia of Chemical Technology," 2nd ed., vol. 14 (1967), pp. 373-390, under the section "Oxo Process."

The production of alcohols by the synthetic "Oxo Process" consists of hydrogenating in the presence of Raney nickel the primary and secondary aldehydes which were previously obtained by the fixation of carbon monoxide and hydrogen on one or more of the double bonds of an olefinic compound.

This saturation reaction, called "hydroformylation," is catalyzed by the octa- and the hydro-carbonyl of cobalt, such compounds being formed in the presence of the synthesizing gas $CO+H_2$ at temperatures of the order of 90 to 170° C. and under pressures between 50 and 400 atm. For the synthesis of aldehydes, the initial cobalt compounds, which are possibly carbonylated, are intimately mixed with the initial olefinic reagents.

The amount of catalyst used amounts to 3-5 g. of metallic cobalt per cubic meter of synthesis gas $CO+H_2$. It is then indispensible, both for the efficiency of the process and for the longevity of the Raney nickel, that the active mass which remains dissolved in the reaction product be recovered and recycled in the present case, after having been regenerated.

It has been suggested that this be accomplished by separating the catalyst in the form cobalt carbonylate of sodium which is insoluble in the products of the synthesis, but is soluble in water. The product is then entrained in a current of synthesis gas $CO+H_2$ after its regeneration as the hydrocarbonyl of cobalt. The inconveniences of this process, which comprise three successive operations, consist of increased cost of the investment and of limited recoveries.

Other process have been suggested, consisting of either isolating the cobalt in a metallic state and converting it anew into octacarbonyl, or of extracting the carbonylated complex by distillation under carbon monoxide at high pressure and recycling it in its catalytically active form. These methods involve many difficulties, especially in commercially sized plants, and produce low yields, due mainly to unavoidable secondary reactions.

SUMMARY OF THE INVENTION

The present invention relates to an original total recovery and direct recycling process for the catalyst toward the hydroformylation stage, without any other chemical transformation, whereby the previously mentioned inconveniences can in a large measure be eliminated. It also makes it possible to utilize the compounds formed during the regeneration of the active material and also the intermediate solvents.

It has been found that if the liquid products of hydroformylation containing the catalyst in a dissolved state are treated with a cyanhydrine or by hydrocyanic acid, preferably in a neutral or reducing medium, the cobalt precipitates quantitatively in the form of a cyanocarbonylated complex. The latter, held in suspension in the initial olefins or in an intermediate solvent, is recycled directly in the reaction zone and is transformed anew into active hydroformylation catalyst soluble in the medium in the presence of the synthesis gas under a pressure which can be varied in the volumetric ratio of $H_2/CO$ between 0.5 and 2, preferably between about 1 and 1.2, depending on the nature of the initial olefinic compounds.

BRIEF DESCRIPTION OF THE DRAWING

The catalyst recovery and recycling circuit of the present invention is indicated schematically for illustration but not for limitation, in a single figure on the drawing annexed to this specification.

The initial charge of the olefinic product containing the catalyst and possibly also a solvent is introduced by conduit 1 into the reactor 2.

The synthesis gas $CO+H_2$ enters simultaneously through conduit 3 into the reactor.

The reaction products, containing the catalyst in solution, leave the reactor through conduit 4 and are refrigerated in 5 before being conducted by conduit 6 to the separator 7.

The liquid products are depressurized to atmospheric pressure by valve 11 and then degasified in the low pressure separator 12, the recovered gas being delivered through conduit 13 to compressor 14 for return to reactor 2.

The liquid products from separator 12 are introduced into the separator 16 by conduit 15 with the cyanhydrine or hydrocyanic acid from conduit 17. The separator 16 is equipped with a stirrer (not shown) and operates at atmospheric or low CO pressure at a temperature of $100 \pm 5°$ C.

After a reaction time of about one hour, the mixture passes through conduit 18 into a decanting centrifuge 19 from where the purified liquid, free from measurable quantities of cobalt, is withdrawn by conduit 20. This liquid can then be further treated to extract the aldehydes therefrom for hydrogenation to alcohols.

The pasty product containing the cyanocarbonyl complex of cobalt is returned through conduit 21 to separator 22 where it is put into suspension in the olefinic starting liquid or in an olefinic solvent received from conduit 23.

The suspension thus obtained is recycled to the reactor 2 by conduit 24 and pump 25.

It is also possible to deliver the pasty product from decanter 19 directly to the reactor 2 by regulating the decanter to keep the product sufficiently fluid.

DESCRIPTION OF THE PREFERRED EMBODIMENTS

According to a variant of this process, applicable in the case of certain primary olefinic materials, the suspension of the cyanocarbonylated complex is preheated in the presence of a portion of the charge under a carbon monoxide pressure slightly less than the reaction pressure. By operating in this manner, the length of the induction period of the hydroformylation reaction and hence the duration of the transformation is diminished.

The cyanidation reagents can be constituted according to this invention by hydrocyanic acid or by an organic compound corresponding to the formula:

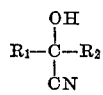

in which $R_1$ and $R_2$ represent a hydrogen atom or the same or different hydrocarbon groups which may be saturated or unsaturated alkyl having 1 to 15 carbon atoms, or aryl, aralkyl or cycloalkyl and can carry other functional groups such as aldehydes or ketones. In particular, it is possible to use the cyanhydrine of the aldehyde formed by the hydroformylation reaction itself.

Specific examples of compounds corresponding to the above formula are as follows.

TABLE I

| $R_1$: | $R_2$ |
| --- | --- |
| —$CH_3$ | —$CH_3$. |
| —$CH_3$ | —$C_2H_5$. |
| —$CH_3$ | —$C(CH_3)_3$. |
| —$CH_3$ | —$C_6H_5$. |
| —$CH_3$ | —$CH_2C_6H_5$. |
| —$C_2H_5$ | —$C_6H_5$. |
| —$C_3H_7$ | —$C_3H_7$. |
| —H | —$C_2H_5$. |
| —H | —$nC_3H_7$. |
| —H | —$isoC_3H_7$. |
| —H | —$nC_4H_9$. |
| —H | —$nC_5H_{11}$. |
| —H | —$nC_6H_{13}$. |
| —H | —$C_9H_{17}$. |
| —H | —$CH=CH_2$. |
| —H | —$CH=CHCH_3$. |
| —H | —$C_6H_5$. |
| —H | —$cycloC_6H_{11}$. |
| —H | —$C_{12}H_{25}$. |

The mechanism of the reaction has not yet been fully explained. It is, however, very likely that several moles of HCN or of —C≡N functional groups in the presence of the catalyst may be transformed into a hydrocyanide of cobalt that also contains some CO groups. Such a complex would be stable in the presence of CO and would not be reconverted into simple cobalt carbonyls.

Examination of the cyanocarbonyl of cobalt under infrared light has shown that the nature of its compounds was entirely independent of the cyaniding agent that was used, regardless of whether it was hydrocyanic acid or any of the various cyanhydrines referred to above.

For regenerating the hydroformulation catalyst, it has been found that in accordance with this invention it is sufficient to bring the cyanocarbonyl complex into the presence of an olefinic compound, thereby converting the cyanide groups into nitriles.

These compounds, which do not in any manner interfere with the hydroformylation reaction, can be used advantageously as solvents in the presence of the catalyst, especially with certain heavy olefinic fractions as starting materials.

According to this invention, the amount of cyanhydrine or hydrocyanic acid used for separating the catalyst, expressed as the ratio of the number of moles of HCN per atom of cobalt, can vary from 2 to 20, and is preferably between 5 and 10. The optimum temperature for the reaction is between 90 and 100° C., but these limits can be extended to cover the range from 60 to 130° C. according to the nature of the cyanhydrine. The duration of the reaction is 30 to 90 minutes.

The cyanocarbonyl complex of cobalt, in suspension in the reaction mixture, is in a form that can be easily separated by decantation for example. It is recycled after having been eventually put back into suspension, either into the olefinic starting material or into a solvent for dissolving the catalyst in the reaction mixture under the temperature and pressure conditions used for the hydroformylation.

It has been found, in accordance with another embodiment of the present invention, that the process of recovery and direct recycling is advantageously applicable to catalysts containing organophosphate promoters, the use of which causes the hydroformylation reactions to be directed toward the production of linear products which improve the rate of conversion of the olefins. These organic phosphorus compounds, comprising for example the phosphites or the tertiary phosphines, can be substituted for one or more moles of the carbon monoxide that is bound to the cobalt in the octa- or hydro-carbonyl, thereby forming very active and highly specific catalysts.

Such catalysts are easily separated from the liquid products resulting from the hydroformylation by application of the cyaniding treatment of the original process, such cyaniding treatment rendering the used catalyst insoluble by converting it into a complex cyanocarbonyl of cobalt to which the organophosphate remains attached. Upon being recycled directly in the reaction zone, this cobalt complex is converted anew into a hydroformylation complex when contacted by olefins.

The following chemical compounds are illustrative examples of the useful organic phosphorus compounds.

$P(OCH_3)_3$
$P(OC_2H_5)_3$
$P(O_4C_4H_9)_3$
$P(OC_6H_5)_3$
$P(C_2H_5)_3$
$P(nC_4H_9)_3$
$P(cyclohexyl)_3$
$P(C_6H_5)_3$
$P(isoC_4H_9)_3$ Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

For purpose of comparison, the crude products resulting from the hydroformylation reaction and containing the aldehydes and 2300 p.p.m. of dissolved cobalt are treated by various cyanhydrines, the ratio of the number of HCN moles per mole of cobalt being kept at 10.

Each mixture is exposed to a neutral or reducing atmosphere one hour, whereupon the solid compound of blue color consisting of cyanocarbonyl complex of cbalt is separated. The amount of cobalt in each remaining liquid, in relation to the temperature of the material, is indicated in the following table.

| Nature of the cyanhydrine | Temperature (0° C.) | Cobalt content of the liquid phase |
|---|---|---|
| Cyanhydrine of acrolein | 80 | Not measurable. |
| Cyanhydrine of benzaldehyde | 80 | 500 p.p.m. |
|  | 120 | Not measurable. |
| Cyanhydrine of butyraldehyde | 120 | Not measurable. |

EXAMPLE 2

The preceding experiment with cyanhydrine of acrolein in a neutral or reducing atmosphere during one hour is repeated with various molar ratios of HCN to cobalt at different temperatures and under CO pressures of 1 and 1.6 atm. The results were the same at both pressures and are listed in the following table.

| Molar ratio of HCN to cobalt | Temperature (0° C.) | Cobalt content in the liquid phase |
|---|---|---|
| 10 | 80 | Not measurable. |
| 5 | 80 | 300 p.p.m. |
| 5 | 110 | Not measurable. |

EXAMPLE 3

The hydroformylation reaction is performed with various olefins under a pressure of 240 atm. and at temperatures of 130 to 145° C., by using in a similar manner the dicobalt octacarbonyl and the cyanocarbonyl complex of this invention designated respectively as A and B. The duration of the process is 2 to 3 hours, corresponding to an 80% theoretical gas absorption, at the end of which time the yield indicated in the following table is obtained, based on the relative amount of olefin converted.

| Initial olefin | Catalyst A | Catalyst B | Solvent | Percent Yield |
|---|---|---|---|---|
| Propene | X |   | Xylene | 80.0 |
|   | X | Heptane | 78.0 |
| Cyclohexene | X |   | Dioxane | 87.5 |
|   | X | do | 87.0 |
| Methyl acrylate | X |   | Benzene | 75.0 |
|   | X | do | 70.0 |

EXAMPLE 4

The liquid products, resulting from the hydroformylation of olefins by their reaction with carbon monoxide and hydrogen, contain in the dissolved state 1500 p.p.m. of cobalt in the form of a complex represented for example by the formula:

$$Co_2(CO)_6 \cdot [P(OCH_3)]_2$$

in which the ratio P/Co is equal to one.

The mixture that is withdrawn from the reaction vessel under an inert atmosphere is treated for about one hour by acrolein cyanhydrine at 50° C., and by benzaldehyde cyanhydrine and butyraldehyde cyanhydrine at 130° C., in such a manner that the ratio CN⁻/Co expressed in moles hydrocyanic acid per mole of cobalt is kept at 10.

The cobalt and residual phosphorus content of the liquid after separation of the complex cyanophosphocarbonyl is practically negligible.

EXAMPLE 5

The operating conditions are identical with those of the preceding experiment, the hydroformylation catalyst being constituted of cobalt carbonyl associated with the ethyl phosphate $P(OC_2H_5)_3$. The cyaniding is performed at 90° C. in the presence of acrolein cyanhydrine, the ratio P/Co/CN⁻ expressed a moles of phosphorus/moles of cobalt/mole of hydrocyanic acid being 1/1/10.

The cobalt and residual phosphorus content of the liquid after separation of the complex cyanophosphocarbonyl is practically negligible.

EXAMPLE 6

In these two hydroformylation experiments the catalysts have resulted from the association of cobalt carbonyl with tertiary phosphines of butyl and of phenyl. The operating conditions are identical with those of Examples 4 and 5, the insolubilizing being effected with the acrolein cyanhydrine at 90° C. for the first catalyst and at 110° C. for the second, the ratio P/Co/CN⁻, expressed as in Example 5, being kept at 1/1/10. It has been impossible to detect measurable quantities of cobalt or phosphorus in the liquid product obtained after separation of the cyanophosphocarbonyl.

What is claimed is:

1. In the hydroformylation of olefinic compounds with mixtures of CO and $H_2$ in a reaction zone under pressures of 50–400 atmospheres at 90–170° C. in the presence of a catalyst consisting essentially of a cobalt carbonyl to produce aldehydic liquid products of hydroformylation containing said catalyst in the dissolved state, the improvement comprising withdrawing from the reactor said liquid products and adding thereto, a sufficient amount of precipitating agent consisting essentially of a cyanide compound selected from the group consisting of hydrogen cyanide and a cyanhydrine of the formula

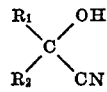

wherein $R_1$ and $R_2$ are H or a hydrocarbyl group having 1–15 carbon atoms, and reacting said catalyst and said precipitating agent at 60–130° C. for a sufficient time to precipitate cobalt substantially quantitatively in the form of cobalt cyanocarbonyl;

physically separating resultant precipitate from said liquid hydroformylation product;

forming a suspension or fluid paste of said separated precipitate in a liquid medium consisting of essentially of an olefinic compound; and recycling said suspension or fluid paste directly to said reaction zone wherein the hydroformylation reaction is conducted.

2. The process of claim 1 in which said cyanide compound is a cyanhydrine of the formula:

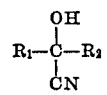

where $R_1$ and $R_2$ are members of the group consisting of hydrogen and alkyl having 1–15 carbon atoms.

3. A process as defined by claim 2 wherein $R_1$ is selected from the group consisting of hydrogen, methyl, ethyl and propyl, and $R_2$ is selected from the group consisting of methyl, ethyl, n-propyl, iso-propyl, tert.-butyl, n-butyl, n-pentyl, n-hexyl, nonyl, dodecyl, cyclohexyl, vinyl, propenyl, phenyl and benzyl.

4. The process of claim 1 in which the molar ratio of the cyanide compound to the cobalt of the catalyst is between about 5 and 10.

5. The process of claim 1 in which the precipitation reaction is performed at temperatures betwen about 90 and 110° C., and during a time of about 30 to 90 minutes.

6. A process as defined by claim 1 wherein said cyanide compound is a cyanhydrine of the aldehyde formed by the hydroformylation reaction.

7. A process as defined by claim 1 wherein the amount of said added cyanide compound, expressed as the ratio of the number of moles of HCN per atom of cobalt is 2:1 to 20:1, and the precipitate is formed at 60–130° C. during a 30 to 90 minute reaction time.

8. A process as defined by claim 7 wherein the precipitate is formed at 90–100° C., and said ratio is 5:1 to 10:1.

9. The process of claim 1 in which the catalyst contains an organophosphorus compound as a promoter selected from the group consisting of a hydrocarbyl phosphite and a hydrocarbyl tertiary phosphine.

10. A process as defined by claim 9 wherein said organophosphorus compound is selected from the group consisting of $P(OCH_3)_3$, $P(OC_2H_5)_3$, $P(O_4C_4H_9)_3$, $P(OC_6H_5)_3$, $P(C_2H_5)_3$, $P(nC_4H_9)_3$, $P(cyclohexyl)_3$, $P(C_6H_5)_3$, and $P(isoC_4H_9)_3$ 11. A process as defined by claim 1 wherein said reacting is conducted under a neutral or reducing atmosphere.

References Cited
UNITED STATES PATENTS

| | | | |
|---|---|---|---|
| 3,340,306 | 9/1967 | Endler et al. | 260—604 HF |
| 2,768,981 | 10/1956 | Catterall | 260—604 HF |
| 3,055,942 | 9/1962 | Roming | 260—604 HF |
| 3,530,190 | 9/1970 | Olivier | 260—604 |

VIVIAN GARNER, Primary Examiner

U.S. Cl. X.R.

252—414; 260—439 R, 598, 604 HF